L. P. HALLADAY.
TRUSS SPRING BUMPER BAR.
APPLICATION FILED JUNE 4, 1919.

1,362,620.

Patented Dec. 21, 1920.

Witness:
W. P. Ireland

Inventor
Lewis P. Halladay.
By
Parks & Carter
Attorneys

UNITED STATES PATENT OFFICE.

LEWIS P. HALLADAY, OF STREATOR, ILLINOIS.

TRUSS-SPRING BUMPER-BAR.

1,362,620.	Specification of Letters Patent.	Patented Dec. 21, 1920.

Application filed June 4, 1919. Serial No. 301,842.

*To all whom it may concern:*

Be it known that I, LEWIS P. HALLADAY, a citizen of the United States, residing at Streator, in the county of La Salle and State of Illinois, have invented a certain new and useful Improvement in Truss-Spring Bumper-Bars, of which the following is a specification.

One object of my invention is to produce a bumper bar which will be strong and highly resilient so as to have the necessary cushioning effect. Another object is to produce a bumper bar which will possess these qualities and which will at the same time be light in construction and cheap and simple to manufacture.

It is illustrated in the accompanying drawing wherein—

Like parts are indicated by like characters throughout.

Figure 2:
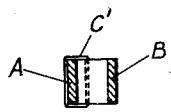
Fig. 2 is a section on lines 2—2 of Fig. 1.
Figure 3:
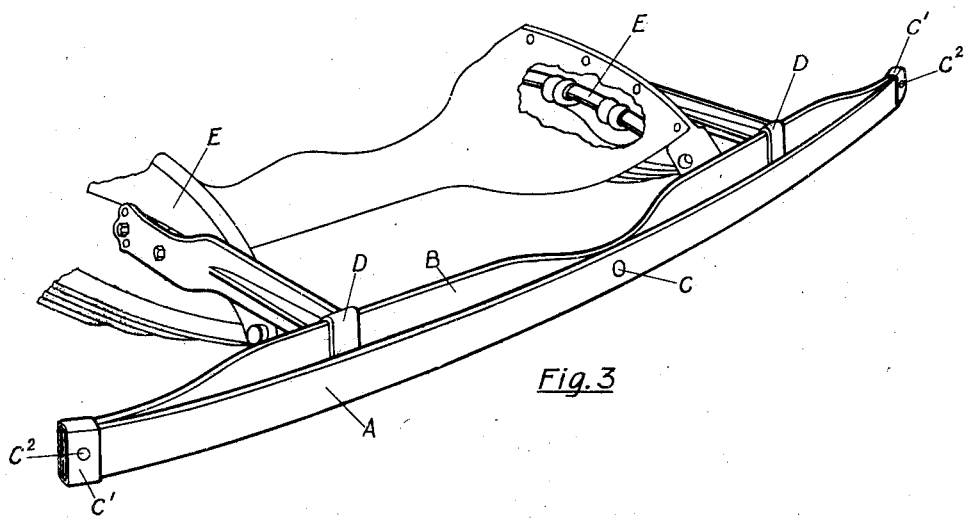
Fig. 3 is a perspective view of a spring as in use.
Figure 1:
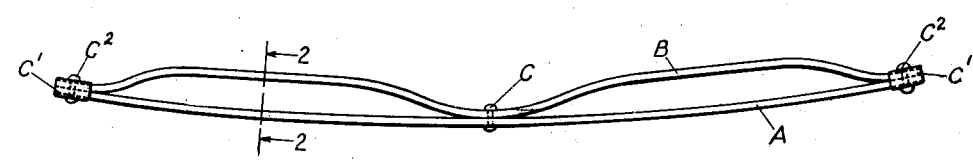
Figure 1 is a plan view.

A is the front spring member and is in the arc of a circle.

B is a rear spring member spaced away from A but in a plane parallel to it and joined to it at their centers by the bolts or rivets C and at its ends by the fittings C¹ C¹ and bolts or rivets C² C².

D D are fittings adapted to grip the rear spring member at one end and at the other to be secured to automobile frame members E E.

The use and operation are as follows:—

The important feature of this invention is the spring construction of the bumper itself as it is adapted for use with a variety of fittings and supports which form no part of the present invention.

The front spring member is shaped on the arc of a circle, facing to the front. In this position it is applied to an automobile so as to cushion it against the shock of collision.

In the usual type of bumper bar where the bar is straight throughout substantially its entire length, any shock coming on the bar will be transmitted directly backward through the frame and fittings to the automobile frame. In my improved form of bumper, the shock will tend to glance off from the bumper. This is due to its shape. As it is in the form of the arc of a circle, a blow striking to the right of the center of the arc, will tend to glance off to the right and a blow striking off to the left of the center of the arc will tend to glance off to the left and in neither case will the full force of the blow be transmitted undiminished directly to the rear and to the bar. This may be well illustrated in the action of the projectile which in striking at right angles against a plane surface will tend to penetrate that surface but when striking it at a greater angle, will tend to glance off from it. Just so, a blow striking the front of my bumper bar will tend to glance off from it unless delivered substantially perpendicular to the tangent of its surface.

Although I have shown and described my bumper bar as having the front conforming to the arc of a circle, I do not wish to be limited to this construction. In practice I found it to be the best, but many changes might be made without departing materially from the spirit of my invention. If the front spring were straight throughout substantially all of its length, its efficiency would be decreased but it would not thereby depart entirely from the spirit of my invention.

I claim:

1. A bumper bar comprising a plurality of flat spring members joined at their ends and at a point intermediate their ends and lying in the same horizontal plane, the leading one of said spring members substantially arcuate in form, the whole comprising in effect two elliptical springs.

2. An automobile bumper comprising two flat spring members arranged one behind the other and in engagement at their ends and center only, the front member being forwardly convex, the rear member being bowed back away from the front one between their points of engagement.

3. An automobile bumper comprising two flat spring members arranged one behind the other and in engagement at their ends and center only, the front member being forwardly convex, the rear member being bowed back away from the front one between their points of engagement and means engaging the rearwardly bowed portions for attaching the bumper to an automobile.

4. An automobile bumper comprising two flat spring members arranged one behind the other, the front one being rearwardly bent at its ends, the rear one being forwardly bent at its ends to engage the front one the two members being in engagement at their centers.

5. An automobile bumper comprising two flat spring members arranged one behind the other and in engagement with one another at both ends and at the middle and bowed apart between the engaging parts to form two full elliptical springs arranged end to end.

6. An automobile bumper comprising two flat spring members arranged one behind the other, the front one being rearwardly bent at its ends, the rear one being forwardly bent at its ends to engage the front one the two members being in engagement at their centers, and means engaging the rearmost member at points removed from its engagement with the front one for attaching the bumper to an automobile frame.

7. An automobile bumper comprising two flat spring members arranged one behind the other and in engagement with one another at both ends and at the middle and bowed apart between the engaging parts to form two full elliptical springs arranged end to end, and means engaging the rearmost member at points removed from its engagement with the front one for attaching the bumper to an automobile frame.

In testimony whereof, I affix my signature in the presence of two witnesses this 26th day of May, 1919.

LEWIS P. HALLADAY.

Witnesses:
W. J. HEINEKE.
G. G. HOOD.